United States Patent Office 3,342,861
Patented Sept. 19, 1967

3,342,861
N,N-DIFLUORAMIDES
Jeremiah P. Freeman and Robert C. Petry, Huntsville, Ala., assignors to Rohm & Haas Company, Philadelphia, Pa., a corporation of Delaware
No Drawing. Filed Feb. 8, 1961, Ser. No. 87,967
8 Claims. (Cl. 260—561)

This invention concerns processes for the preparation of amides having fluorine substituents on the nitrogen atom.

The compounds of the present invention are of the general formula $$RCONF_2$$

and are prepared by the reaction of tetrafluorohydrazine, $N_2F_4$, with aldehydes of the general formula $$RCHO$$

in which R is lower alkyl containing 1 to 5 carbon atoms.

The reaction is carried out in the presence of a free radical initiator.

The compounds of the present invention are of value as a source of difluoramine, $HNF_2$. Thus, aqueous or alcoholic acid hydrolysis of the N,N-difluoramides of the present invention produces $HNF_2$. $HNF_2$, by addition to ketones, produces alcohols containing $NF_2$ groups which alcohols, when esterified with unsaturated acids, give polymerizable monomers. The polymers of such monomers are of value as solvent resistant coatings, as binders for caulking compounds and, when plasticized, are useful as components of pressure sensitive adhesives.

The preparation of $N_2F_4$ is set forth by Colburn et al. in J.A.C.S. 80, 5004 (1958) and the information therein is incorporated herein by reference. $N_2F_4$ is prepared by the thermal reaction of nitrogen trifluoride with fluorine acceptors, such as copper, bismuth and arsenic.

The lower aliphatic aldehydes containing 1 to 5 carbon atoms suitable for use in the process of the present invention include acetaldehyde, propanol, isopropanol, butyraldehyde, isobutyraldehyde, ethylmethylacetaldehyde, valeraldehyde, and isovaleraldehyde. The reaction of the present process can be employed using aldehydes containing more than 5 carbon atoms but the reaction is sluggish and yields are low.

The temperature of the reaction mixture will vary depending on the aldehyde being used. Since it is preferred to conduct the reaction in the vapor phase, the reaction temperature should always be above the boiling point of the aldehyde being used. Temperatures in the range from 80° C. to 200° C. can be used with the preferred range being from 130° C. to 150° C. The reaction time will vary from 30 minutes to 60 minutes depending on the reactivity of the aldehyde and the amount of catalyst used. Since the reaction products are stable under the reaction conditions, prolonged heating does not adversely affect the yield.

The reaction is catalyzed by a free radical initiator and the use of such a catalyst is preferred although not required. Typical of such catalysts are organic or inorganic peroxides such as diethyl peroxide, di-tert-butyl peroxide, benzoyl peroxide, lauroyl peroxide, hydrogen peroxide, and the like.

The molar ratios of aldehyde to $N_2F_4$ can be varied widely and still be within the scope of the invention. Theoretically, the reaction requires one mole of $N_2F_4$ for each mole of aldehyde, but since any unused $N_2F_4$ can be readily recovered, the preferred embodiment employs an excess of $N_2F_4$ in order to obtain higher yields of the desired product. Thus, from 2 to up to 10 moles of $N_2F_4$ may be employed per mole of aldehyde, the excess being recovered and reused. Preferred is the use of 2 to 5 moles $N_2F_4$ per mole of aldehyde.

It is preferred to carry out the reaction in an anhydrous inert, i.e., oxygen-free, atmosphere, and so the reaction vessel is flushed with a dry inert gas such as nitrogen, helium or argon before the reactants are charged to the vessel. The inert anhydrous atmosphere is maintained throughout the reaction.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

N,N-difluoracetamide

A mixture of 378 cc. (0.017 mole) of tetrafluorohydrazine, 192 cc. (0.009 mole) of gaseous acetaldehyde and four drops of di-t-butyl peroxide was heated in a glas bulb to 145° for 45 minutes. The mixture was fractionated through a —80° bath, —130° bath and liquid nitrogen. The $N_2F_4$ recovered amounted to 200 cc. The product retained in the —80° bath was the desired N,N-difluoracetamide as revealed by mass spectrum, n.m.r. and infraded analysis, M.P. 45–47° C./atm. press.

*Analysis.*—Calculated for $C_2H_3F_2NO$: C, 25.27; H, 3.18; N, 14.74; F, 39.98.

Found: C, 26.36; H, 3.11; N, 14.40; F, 37.88.

EXAMPLE II

N,N-difluorobutyramide

Using the process set forth in Example I, an equivalent amount of butyraldehyde was substituted for the acetaldehyde. N,N-difluorobutyramide was produced in good yield.

We claim:
1. A process for the preparation of N,N'-difluoramides of the general formula

$$R—CONF_2$$

in which R is an alkyl group containing 1 to 5 carbon atoms which comprises reacting in the presence of a free radical initiator tetrafluorohydrazine, $N_2F_4$, with an aldehyde of the formula $$RCHO$$

in which R is an alkyl group containing 1 to 5 carbon atoms and recovering the N,N-difluoramide from the reaction mixture.

2. A process as set forth in claim 1 in which the reaction temperature is from 80° C. to 200° C.
3. A process as set forth in claim 1 in which the reaction temperature is from 130° C. to 150° C.
4. A process as set forth in claim 1 in which the molar ratio of aldehyde to $N_2F_4$ is from 1 to 1 to 1 to 10.
5. A process as set forth in claim 1 in which the molar ratio of aldehyde to $N_2F_4$ is from 1 to 2 to 1 to 5.

6. A process as set forth in claim 1 in which the free radical initiator is selected from the group consisting of diethyl peroxide, di-tert-butyl peroxide, benzoyl peroxide, lauroyl peroxide and hydrogen peroxide.

7. A process as set forth in claim 1 in which the reaction is conducted in an anhydrous atmosphere which is inert under the reaction conditions.

8. A process as set forth in claim 7 in which the inert atmosphere is selected from the group consisting of nitrogen, argon and helium.

References Cited

Emeleus et al., Advances in Inorganic Chemistry and Radiochemistry, vol. 3 (1961), pp. 356 to 366.

ALEX MAZEL, *Primary Examiner.*

J. A. NARCAVAGE, *Assistant Examiner.*